United States Patent [19]

Azetsu

[11] Patent Number: 5,041,702

[45] Date of Patent: Aug. 20, 1991

[54] CONTACT STRIP FOR PANTOGRAPH USED ON ELECTRIC RAILCAR

[75] Inventor: Tsuneki Azetsu, Beppu, Japan

[73] Assignee: Teikoku Carbon Industry Co., Ltd., Tokyo, Japan

[21] Appl. No.: 398,603

[22] Filed: Aug. 25, 1989

[30] Foreign Application Priority Data

Aug. 30, 1988 [JP] Japan .................. 63-213677

[51] Int. Cl.$^5$ .................................. B60L 5/08
[52] U.S. Cl. ................................ 191/55; 191/45 R
[58] Field of Search ............ 191/45 R, 50, 54, 55, 191/57, 58; 310/251, 252

[56] References Cited

U.S. PATENT DOCUMENTS

| 547,031 | 10/1895 | Reichel | 191/45 R X |
|---|---|---|---|
| 567,899 | 9/1896 | Hayn | 191/45 R X |
| 742,426 | 10/1903 | Hill | 191/45 R X |
| 1,949,441 | 3/1934 | Wylie et al. | 191/55 |
| 3,582,575 | 6/1971 | Scofield | 191/29 DM |
| 3,602,655 | 8/1971 | Scofield et al. | 191/29 DM |
| 3,918,557 | 11/1975 | Ross, Sr. | 191/45 R X |
| 4,014,417 | 3/1977 | Kugler et al. | 191/29 DM |
| 4,084,669 | 4/1978 | Suwa et al. | 310/251 X |

FOREIGN PATENT DOCUMENTS

| 1513613 | 8/1969 | Fed. Rep. of Germany .... 191/45 R |
|---|---|---|
| 50-36809 | 11/1975 | Japan . |
| 52-24487 | 7/1977 | Japan . |
| 54-42332 | 12/1979 | Japan . |
| 55-44143 | 11/1980 | Japan . |
| 57-43502 | 3/1982 | Japan .................. 191/55 |

Primary Examiner—Robert J. Spar
Assistant Examiner—Scott L. Lowe
Attorney, Agent, or Firm—Sixbey, Friedman, Leedom & Ferguson

[57] ABSTRACT

A contact strip for a pantograph used on an electric railcar, comprising a front surface member which is to be in contact with the trolley wire to collect current from the latter and a rear surface member which is to be fixed to the collector head, the front surface member being made of an abrasion-resistant metal plate having desired mechanical characteristics and resistivity, the rear surface member being made of a metal plate having the better mechanical characteristics, a same or lower resistivity than the front surface member and a specific gravity less than that of the front surface member, the front and rear surface members being connected integrally to each other. Therefore, the specific gravity of the entire contact strip can be reduced while maintaining the mechanical and electrical characteristics required for the contact strips for the pantograph used on high-speed electric railcars and also the follow-up, or connection, of the contact strip with the trolley wire can be remarkably improved, whereby the arcing between the contact strips and trolley wire can be considerably reduced. Thus, the mechanical abrasion and arcing-caused abrasion of the trolley wire and contact strips can be minimized.

4 Claims, 2 Drawing Sheets

5,041,702

CONTACT STRIP FOR PANTOGRAPH USED ON ELECTRIC RAILCAR

BACKGROUND OF THE INVENTION a) Field of the Invention

The present invention relates to contact strips for photographs used on electric railcars, and more particularly to a contact strip for a pantograph (will be referred to simply as "contact strip" hereinafter) used on the electric railcar which collects the current from the trolley wire while sliding on the trolley wire without any lubricating oil, and which is lightweight, highly resistant against abrasion and thus suitably usable on a high-speed electric railcar such as the Japanese Shinkansen-line railcars running at a speed higher than 200 km/hour.

b) Description of the Prior Art

Generally, a plurality of the contact strips 20 are connected in series with each other and also in the proximity of each other on the collector heads or collecting shoes 12 fixed in two rows atop the pantograph 10 of an electric railcar. In the case of the Japanese Shinkansen-line electric railcars, for example, six contact strips are fixed on one pantograph, that is, three on each collector head, while in the case of the Japanese existing-railway electric railcars, eight contact strips are fixed on one pantograph, that is, four on each collector head. The electric locomotives have provided twelve contact strips on one pantograph, that is, six on each collector head. As shown in FIGS. 2 (A) and (B), the structure of the conventional contact strips 20 used on such electric railcars is wholly made of a sintered alloy of the same materials. It is required that the contact strips should have excellent mechanical characteristics such as tensile strength, value of impact energy, hardness, etc. and a resistivity, corresponding to the speed of the electric railcar on which they are to be used. The current Standard for the Japanese Shinkansen-line electric railcars requires that the iron-based abrasion-resistant sintered alloys be more than about 7 in specific gravity and copper-based abrasion-resistant sintered alloys be more than 8 in specific gravity. Materials having lower specific gravities those set forth above cannot meet the mechanical and electrical requirements needed for use on the Shinkansen-line electric railcars. Such conventional abrasion-resistant sintered alloys are disclosed in the Japanese Examined Patent Publications (Kokoku) No. Sho 55-44143, 54-42332, 52-24487 and 50-36809.

The current Japanese Shinkansen-line electric railcars Standard for the contact strips requires that the thickness T be 10 mm, width W be 25 mm and length L be 270 mm. Namely, the iron-based abrasion-resistant sintered alloy should be about 480 g in weight per contact strip, while the copper-based abrasion-resistance sintered alloy should be about 560 g in weight per contact strip. As previously mentioned, six contact strips are used on one pantograph of the Shinkansen-line electric rail car such that the total weight of the contact strips if they were made of the iron-based abrasion-resistant sintered alloy would be about 2,880 g while the total weight of the contact strips if made of the copper-based abrasion-resistant sintered alloy be 3,360 g.

Since the current contact strips for the electric rail cars are considerably heavy, the electric rail cars are driven by a current while the pantograph is being forced against the trolley wire from below by a lifting spring force of 5.5 kg. However, as the electric railcar speed increases, the follow-up, or connection, of the contact strips with the trolley wires becomes degraded and arcing takes place between them, so that the arcing-caused abrasion of the trolley wires and contact strips increases. That is to say, the abrasion of the contact strips and trolley wires, caused while the electric railcar is running, is a sum of the abrasion due to the mechanical sliding of the contact strips fixed against the pantograph on the trolley wires and the arcing-caused abrasion. Namely, the arcing-caused abrasion will increase because the follow-up of the contact strips with the trolley wire becomes worse as the railcar runs at a higher speed.

SUMMARY OF THE INVENTION

The present invention has an object to overcome the above-mentioned drawbacks of the conventional contact strips by providing a contact strip suitable for use on electric railcars which run at a speed higher than 200 km/hour.

The present invention has another object to provide a light-weight and highly abrasion-resistant contact strip of which the improved follow-up, or connection, with the trolley wire when the electric railcar runs is so improved as to minimize the abrasion of the contact strips and trolley wire.

The above-mentioned objects can be accomplished by providing a contact strip comprising a front surface member which is to be in contact with the trolley wire to collect the current from the latter and a rear surface member which is to be fixed to the collector head, the front surface member being made of an abrasion-resistant metal plate having desired mechanical characteristics and resistivity, the rear surface member being made of a metal plate having the same or better mechanical characteristics and a lower resistivity than the front surface member and specific gravity than that of the front surface member, the front and rear surface members being connected integrally to each other, thereby reducing the specific gravity of the entire contact strip while maintaining the mechanical and electrical characteristics required for the contact strips for the high-speed electric railcars.

DETAILED DESCRIPTION OF THE PREFERRED EMBODIMENTS

Figure 1:
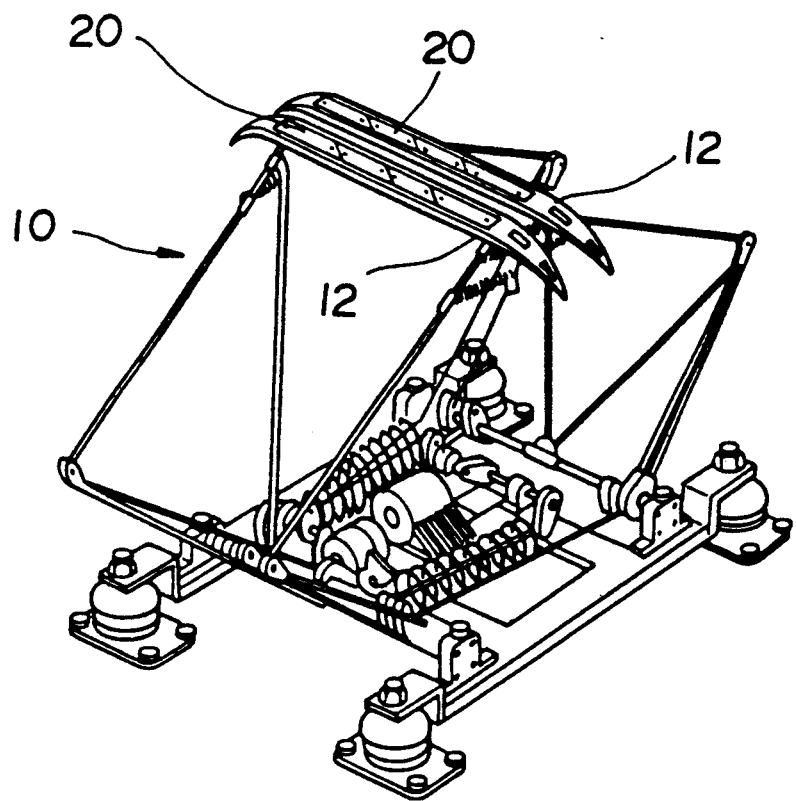
FIG. 1 is a schematic diagram showing the essential portions of an ordinary pantograph for use on electric railcars.
Figure 2A:
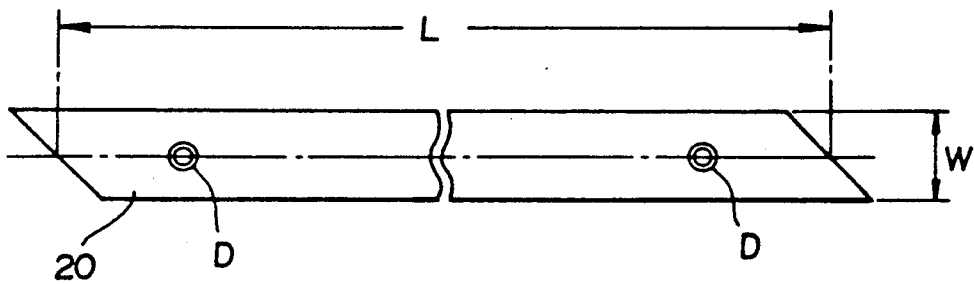
FIG. 2 (A) is a partially fragmentary plan view of prior art contact strips for electric railcar and FIG. 2 (B) is a partially fragmentary elevation of the contact strips in FIG. 2 (A)
Figure 2B:
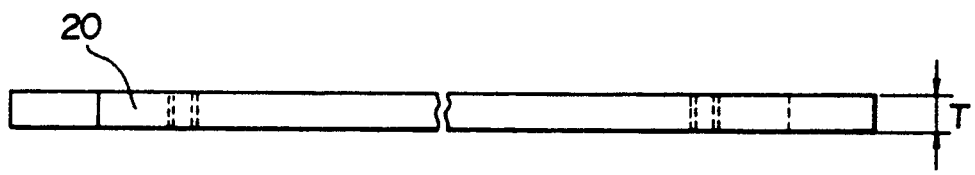
Figure 3A:
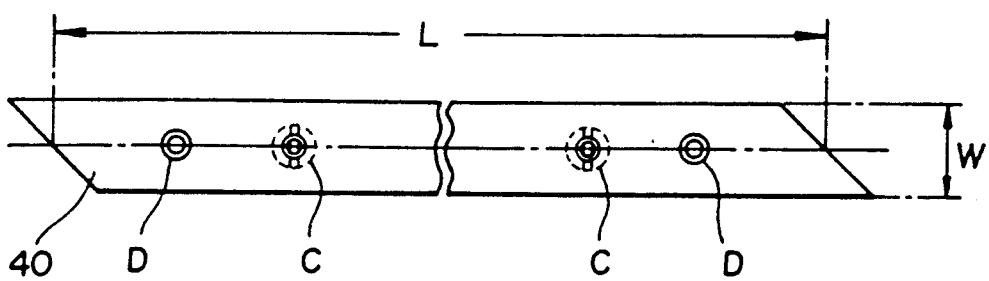
FIG. 3 (A) a partial fragmentary plan view of one embodiment of the contact strip for electric rail car according to the present invention, and FIG. 3 (B) is a partial fragmentary elevation of the contact strip in FIG. 3 (A).
Figure 3B:
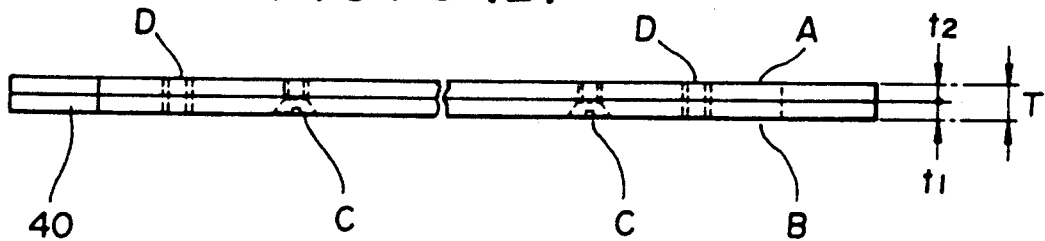

Embodiments of the contact strip according to the present invention will be described below with reference to FIGS. 3 (A) and (B) which correspond to FIGS. 2 (A) and (B), respectively, which show prior art contact strip.

The contact strip 40 in this embodiment is composed of a front surface member A which is in contact with the trolley wire to collect the current from the latter, and a rear surface member B fixed to the collector head. The front surface member A has a length L (270 mm) and width W (25 mm), which are in compliance with the requirements stipulated in JIS (Japanese Industrial Standard), and also a thickness t2 smaller than the thickness T which meets the requirement in JIS. The rear surface member B has a length L, width W and thickness t1 (T −t2), which are in compliance with the requirements in JIS. These surface members A and B are manufactured individually, superposed on each other and connected to each other with screws C.

The front surface member A is made of an abrasion-resistant sintered alloy having desired mechanical characteristics and resistivity, and the rear surface member B is made of a metal plate having better mechanical characteristics than the front surface member and a lower resistivity and specific gravity than that of the front surface member.

In the Figures, D indicates a screw hole for fixing the contact strip 40 to the collector head.

Note that the above-mentioned values of thickness t1 and t2 vary somewhat from one electric railcar to another having the pantographs on which the contact strips are to be used. Suitably, t1=3 to 5 mm while t2=7 to 5 mm. The examples in which the contact strip has front and rear surface members of t1=t2=5 mm in thickness, respectively will be described below.

EMBODIMENT 1

The front surface member A used in the iron-based contact strips currently used for the pantograph used on the Shinkansen-line electric railcar, having the physical properties such as tensile strength of 23 kg/mm, Charpy impact value of 1.3 kgm/cm$^2$, Brinell hardness of 95, resistivity of 36 $\mu\Omega$cm and specific gravity of 7, was formed to have a thickness of 5 mm, width of 25 mm and length of 270 mm, while the rear surface member B was made of a high strength aluminum alloy having the physical properties such as tensile strength of 46 kg/mm, Charpy impact value of 3 kgm/cm$^2$, Brinell hardness of 98, resistivity of 3.2 $\mu\Omega$cm and specific gravity of 2.8 and formed to have a thickness of 5 mm, width of 25 mm and length of 270 mm. These surface members A and B were superposed on each other and integrally connected to each other with screws C to form an iron-based lightweight composite abrasion resistant contact strip of 10 mm in thickness, 25 mm in width, 270 mm in length and of about 333 g in weight.

COMPARATIVE EXAMPLE 1

An iron-based abrasion-resistant contact strip (weighing about 480 g) of 10 mm in thickness, 25 mm in width and 270 mm in length was made of a same material as that of the front surface member A in the embodiment 1.

EMBODIMENT 2

The front surface member A used in the copper-based contact strips currently used for the pantograph used on the Shinkansen-line electric railcar, having physical properties such as tensile strength of 22 kg/mm, Charpy impact value of 1.5 kgm/cm$^2$, Brinell hardness of 91, resistivity of 18 $\mu\Omega$cm and specific gravity of 8, was formed to have a thickness of 5 mm, width of 25 mm and length of 270 mm, while the rear surface member B was made of a similar high strength aluminum alloy as in the embodiment 1. These surface members A and B were connected integrally to each other with screws C and superposed on each other to form a copper-based lightweight composite abrasion-resistant contact strip of 10 mm in thickness, 25 mm in width, 270 mm in length and of about 373 g in weight.

COMPARATIVE EXAMPLE 2

An iron-based abrasion-resistant contact strip (weighing about 560 g) of 10 mm in thickness, 25 mm in width and 270 mm in length was made of a similar material as that of the front surface member A in the embodiment 2.

As obvious from the comparison in physical properties between the embodiment 1 and comparative example 1, embodiment 1 has the tensile strength, Charpy impact value and Brinell hardness which are all larger than in the example 1. The resistivity of the former is smaller than in the latter, and also the former is more lightweight than the latter.

Similarly, as shown from the comparison in physical properties between embodiment 2 and example 2, the former has better mechanical and electrical characteristics than the latter as is the relation between embodiment 1 and example 1, and the embodiment 2 is more lightweight than example 2.

TEST RESULTS

Test pieces of 10×25×90 mm in size were prepared by cutting the composite contact strips prepared as in above-mentioned embodiments 1 and 2 and unit contact strips of 10×25×270 mm in size prepared as the comparative examples 1 and 2, and each was attached on the rotary plate of a rotary type current collection and abrasion tester having a diameter of about 640 mm. The test piece was slid on a trolley wire of 110 mm$^2$ in GT sectional area disposed on a circumference of nearly 640 mm in diameter at a sliding speed of 160 km/hour with a power of 100 A AC for 60 min while being pressed to the trolley wire with a lifting force of 5.5 kg. The specific wear rate of each test piece and the abraded thickness (mm) of the trolley were after the test piece had passed by a predetermined position on the circumference of the trolley wire ten thousand times were measured. The results of the measurements are shown in the Table below. The specific wear rate is presented by an abraded volume (mm$^3$) of the contact strip after sliding a distance of 1 mm when forced to the trolley wire under a load of 1 kg, and the abraded thickness (mm) of the trolley wire was evaluated using a micrometer and is presented by the mean value of the abraded thickness (mm) at the predetermined eight equally spaced positions along the circumference.

| | Comparison results | |
|---|---|---|
| Test piece | Specific wear rate of contact strip (10$^{-7}$ mm$^3$/kg-mm) | Abraded thickness of trolley wire of 110 mm$^2$ in GT sectional area when contact strip has passed ten thousand times (mm) |
| Embodiment 1 (iron-based lightweight composite contact strip) | 0.9 | 0.0010 |
| Embodiment 2 (copper-based light-weight composite contact strip) | 1.8 | 0.0013 |
| Comparative example 1 (iron- | 3.1 | 0.0021 |

-continued

| Test piece | Comparison results | |
|---|---|---|
| | Specific wear rate of contact strip ($10^{-7}$ mm$^3$/kg-mm) | Abraded thickness of trolley wire of 110 mm$^2$ in GT sectional area when contact strip has passed ten thousand times (mm) |
| based unit contact strip for Shinkansen-line) Comparative example 2 (copper-based unit contact strip for Shinkansen-line) | 4.3 | 0.0025 |

As seen from the Table above, the composite contact strips in embodiments 1 and 2 of the present invention perform well with the trolley wire because they are lightweight, as compared with the unit contact strips made of a single material in comparative examples 1 and 2. So, it is possible to considerably reduce the arcing caused abrasion of the contract strips and trolley wire.

Note that embodiments 1 and 2 and comparative examples 1 and 2 having the following weights:
One contact strip in embodiment 1: Approx. 333 g
One contact strip in example 1: Approx. 480 g
Namely, the embodiment 1/example 1 = 333/480 = About 0.69
One contact strip in embodiment 2: Approx. 373 g
One contact strip in example 2: Approx. 560 g
Namely, the embodiment 2/example 2 = 373/560 = About 0.67

The weight of all the contact strips used on one pantograph will be compared between the embodiments and comparative examples. In the case of the Shinkansen-line electric railcars, six contact strips are used on one pantograph. Namely, in the case of example 1, the contact strips used weigh 480 g×6=2,880 g. The contact strips in the embodiment 1 weigh 333 g×6=1,998 g. The weight of example 1 is 882 g larger than that of the embodiment 1.

Similarly, the contact strips in example 2 weigh 560 g ×6=3,360 g, while those in the embodiment 2 weigh 373 g×6 =2,238 g. There is a weight difference of 1,122 g between the example 2 and embodiment 2.

As having been described in the foregoing, the contact strip according to the present invention comprises a front surface member made of an abrasion-resistant metal plate having desired mechanical characteristics and resistivity and a rear surface member made of a metal plate having the same or better mechanical characteristics than the front surface member and a lower resistivity than the front surface member and a specific gravity has than that of the front surface member, the front and rear surface members being connected integrally to each other. Therefore, the contact strip can have the total weight reduced to improve its follow-up with the trolley wire. The rear surface member is somewhat inferior in anti-abrasion lubrication to the front surface member, but since the contact strips are to be replaced with new ones for assurance of safety in the case of the Shinkansen-line electric railcars when their thickness has been reduced to about 5 mm (about a half of the initial thickness), the inferiority in anti-abrasion lubrication of the rear surface member will not be any problem in practice.

As mentioned in the foregoing, according to the present invention, it is possible to provide a lightweight contact strip while maintaining its capabilities of anti-abrasion sliding and current collection. So, the follow-up of the contact strips with the trolley wire is improved and the arcing when they are off of the trolley wire is reduced. Thus the abrasion of the trolley wire as well as the contact strip itself can be effectively minimized.

What is claimed is:

1. A contact strip for a pantograph used on an electric railcar, comprising a front surface member which is to be in contact with the trolley wire to collect the current from said wire and a rear surface member which is to be fixed to the collector head, said front surface member being made of an abrasion-resistant metal plate having a first predetermined tensile strength, a first predetermined Charpy Index value, a first predetermined Brinell Hardness, a first predetermined resistivity and a first predetermined specific gravity, said rear surface member being made of a metal plate having a second predetermined tensile strength, a second predetermined Charpy Index value and a second predetermined Brinell Hardness, at least equal to said first predetermined tensile strength, said first predetermined Charpy Index value, and said first predetermined Brinell Hardness of said first surface member, respectively, and said rear surface member having a second predetermined resistivity and a second predetermined specific gravity less than said first predetermined resistivity and said first predetermined specific gravity of said front surface member, respectively, said front and rear 2. A contact strip according to claim 1, wherein the thickness of said front surface member is not less than the thickness of said rear surface member. surface members being connected integrally to each other wherein said front surface member is made of an iron-based abrasion-resistant sintered alloy while said rear surface member is made of a high-strength aluminum alloy.

3. A contact strip for a pantograph used on an electric railcar, comprising a front surface member which is to be in contact with the trolley wire to collect the current from said wire and a rear surface member which is to be fixed to the collector head, said front surface member being made of an abrasion-resistant metal plate having a first predetermined tensile strength, a first predetermined Charpy Index value, a first predetermined Brinell Hardness, a first predetermined resistivity and a first predetermined specific gravity, said rear surface member being made of a metal plate having a second predetermined tensile strength, a second predetermined Charpy Index value and a second predetermined Brinell Hardness, at least equal to said first predetermined tensile strength, said first predetermined Charpy Index value, and said first predetermined Brinell Hardness of said first surface member, respectively, and said rear surface member having a second predetermined resistivity and a second predetermined specific gravity less than said first predetermined resistivity and said first predetermined specific gravity of said front surface member, respectively, said front and rear surface members being connected integrally to each other, wherein said front surface member is made of a copper-based abrasion resistant sintered alloy while said rear surface member is made of a high-strength aluminum alloy.

4. A contact strip for a pantograph used on an electric railcar, comprising a front surface member which is to be in contact with the trolley wire to collect the current from said wire and a rear surface member which is to be fixed to the collector head, said front surface member being made of an abrasion-resistant metal plate having a first predetermined tensile strength, a first predetermined Charpy Index value, a first predetermined Brinell Hardness, a first predetermined resistivity and a first predetermined specific gravity, said rear surface member being made of a metal plate having a second predetermined tensile strength, a second predetermined Charpy Index value and a second predetermined Brinell Hardness, at least equal to said first predetermined tensile strength, said first predetermined Charpy Index value, and said first predetermined Brinell Hardness of said first surface member, respectively, and said rear surface member having a second predetermined resistivity and a second predetermined specific gravity less than said first predetermined resistivity and said first predetermined specific gravity of said front surface member, respectively, said front and rear surface members being connected integrally to each other, wherein said front surface member is made of a copper-based abrasion resistant sintered alloy while said rear surface member is made of a high-strength aluminum alloy and said front surface member has a thickness not less than that of said rear surface member.

* * * * *